US006944534B2

(12) United States Patent
Trautenberg

(10) Patent No.: US 6,944,534 B2
(45) Date of Patent: Sep. 13, 2005

(54) PROCESS FOR TRANSMITTING STATUS MESSAGES TO TERMINALS OF A SATELLITE DATA TRANSMISSION SYSTEM, IN PARTICULAR IN A SATELLITE NAVIGATION SYSTEM

(75) Inventor: Hans Trautenberg, Neumarkt (DE)

(73) Assignee: EADS Astrium GmbH, Munich (DE)

( * ) Notice: Subject to any disclaimer, the term of this patent is extended or adjusted under 35 U.S.C. 154(b) by 0 days.

(21) Appl. No.: 10/840,223

(22) Filed: May 7, 2004

(65) Prior Publication Data

US 2004/0248559 A1 Dec. 9, 2004

Related U.S. Application Data

(63) Continuation of application No. PCT/EP02/12313, filed on Nov. 5, 2002.

(30) Foreign Application Priority Data

Nov. 8, 2001 (DE) .......................................... 101 54 493
Nov. 26, 2001 (DE) .......................................... 101 57 619

(51) Int. Cl.[7] ............................ G01S 1/04; H04B 7/185
(52) U.S. Cl. ....................... 701/200; 701/213; 701/214; 370/528; 340/995.12
(58) Field of Search ................................ 701/200, 213, 701/208, 210, 211; 340/995.12, 995.13, 955.14; 455/414.4; 370/324, 528, 336, 347, 474, 498; 709/245

(56) References Cited

U.S. PATENT DOCUMENTS

| 5,153,598 A | | 10/1992 | Alves, Jr. .................... 342/352 |
| 5,877,725 A | * | 3/1999 | Kalafus .................. 342/357.12 |
| 6,128,322 A | * | 10/2000 | Rasanen et al. ............. 370/536 |
| 6,205,377 B1 | | 3/2001 | Lupash et al. ................. 701/13 |
| 6,297,770 B1 | * | 10/2001 | Ueda et al. ............. 342/357.12 |
| 6,424,285 B1 | * | 7/2002 | Perdue et al. ................ 341/176 |
| 2002/0013149 A1 | * | 1/2002 | Threadgill et al. .......... 455/427 |

FOREIGN PATENT DOCUMENTS

| DE | 19732907 | 2/1998 |
| DE | 19909576 | 9/1999 |
| JP | 11-4202 | 1/1999 |
| WO | 98/10569 | 3/1998 |

OTHER PUBLICATIONS

English Language Abstract of JP11–4202.
J. Benedicto et al., "Galileo: Satellite System Design and Technology Developments," Retrieved from ravel.Esrin.esa.it/docs/Galileo_world_paper_Dec_2000.pdf on Jan. 20, 2003.
A. J. Van Dierendonck et al., "The GPS Navigation Message," Principles and operational Aspects of Precision Position Determinations Systems, Jul. 1979, pp. 6/1–21.

* cited by examiner

*Primary Examiner*—Tan Q. Nguyen
(74) *Attorney, Agent, or Firm*—Greenblum & Bernstein, P.L.C.

(57) ABSTRACT

Process for transmitting status messages to user terminals of a satellite data transmission system that transmits data formed as navigation blocks. The process includes reserving at least one selected data area in the navigation data blocks, splitting status messages into status data blocks that are smaller than the navigation data blocks, inserting the status data blocks into consecutive reserved data areas of the navigation data blocks and inserting, when the status messages are modified, modification message data blocks into subsequent reserved data areas of the navigation data blocks in place of one or more status data blocks of the status messages. The instant abstract is neither intended to define the invention disclosed in this specification nor intended to limit the scope of the invention in any way.

18 Claims, 2 Drawing Sheets

PROCESS FOR TRANSMITTING STATUS MESSAGES TO TERMINALS OF A SATELLITE DATA TRANSMISSION SYSTEM, IN PARTICULAR IN A SATELLITE NAVIGATION SYSTEM

CROSS-REFERENCE TO RELATED APPLICATIONS

The present application is a Continuation of International Patent Application No. PCT/EP02/12313 filed Nov. 5, 2002, which claims priority of German Patent Application No. 101 54 493.6 filed Nov. 8, 2001 and of German Patent Application No. 101 57 619.6 filed Nov. 26, 2001. The disclosure of International Patent Application No. PCT/EP02/12313 filed Nov. 5, 2002 is expressly incorporated by reference herein in its entirety.

BACKGROUND OF THE INVENTION

1. Field of the Invention

The present invention relates to a process for transmitting status messages to user terminals of a satellite data transmission system which is embodied for the data transmission of user data blocks from satellites to the user terminals. Such satellite data transmission systems can in principle transmit different types of user data, such as communication data or multi-media data, as well as navigation data, as is known, e.g., from U.S. Pat. No. 6,205,377. The present invention is fundamentally applicable to all types of such satellite data transmission systems.

2. Discussion of Background Information

It can be necessary in such satellite data transmission systems, in addition to the usual user data, to also transmit additional status messages such as, e.g., identification data of system components, version data of certain software, also traffic information for ground, water or air transportation. Modifications of the status information can also occur, such as, e.g., modifications of software versions, of flight routes in air traffic information, or congestion developing in ground traffic information. In the case of transmitting navigation data, integrity information can be provided as status messages, which integrity information can provide information on the integrity of a satellite navigation system. Here too time modifications of the integrity information can occur. Taking integrity information into consideration within the scope of satellite navigation systems is likewise fundamentally known from U.S. Pat. No. 6,205,377 and from J. Benedicto et al. *GALILEO: Satellite System Design and Technology Developments*, European Space Agency, November 2000, which can be downloaded, e.g., at http://ravel.esrin.esa.it/docs/galileo_world_paper_Dec_2000.pdf.

However, such status messages can hinder either the transmission of the user data to the user terminals or the evaluation of the user data or the user data signals in the user terminals if the transmission of the status messages takes place at a high data rate. However, if the transmission of the status messages occurs at a low data rate, an updating of the status messages in the user terminals can occur only slowly or inadequately.

SUMMARY OF THE INVENTION

The present invention provides a way of transmitting status messages within the scope of a satellite data transmission system which is embodied for the data transmission of user data blocks, and which hinders the transmission of user data as little as possible and yet permits a rapid update of status information. According to the invention, at least one selected data area is reserved in the navigation data blocks, the status messages are split up into data blocks that are smaller than the navigation data block, the data blocks of the status messages are inserted into consecutive reserved data areas of the navigation data blocks, and, when there is a modification of the status messages, modification message data blocks are inserted into subsequent reserved data areas of the navigation data blocks in place of one or more data blocks of the status messages.

A process is proposed for transmitting status messages to user terminals of a satellite data transmission system which is embodied for the data transmission of user data blocks from satellites to the user terminals. According to the present invention it is provided that the status messages are first split up into data blocks that are smaller than the data blocks of the user data. Then at least one data block each of the status messages is inserted into consecutive data blocks of the user data. Several status message data blocks can also be inserted into one user data block. The data of the status message are thus integrated into the data volume of the data blocks of the user data. Depending on the volume of the status messages, the data blocks of the status messages are thereby divided among a sufficiently large number of user data blocks. These status message data blocks can thereby be inserted into the user data blocks in a regular sequence, regularly transmitted to the user terminals together with the user data and also regularly updated accordingly. In order to prevent the status messages hindering the transmission of the user data, it can be provided in particular that the status message data blocks account for a maximum of 25% of the entire data content of a user data block. However, the case can hereby occur that a minimum data rate is given due to a system-defined or terminal-side or user-side defined time frame for the transmission of the complete status messages, which minimum data rate must at least be observed.

According to the invention it is provided that when there is a modification of the status messages, a modification message is inserted into subsequent data blocks of the user data in place of one or more data blocks of the status messages. The insertion of the status message data blocks into the user data blocks is thus interrupted, and the modification message is directly inserted in their place likewise in the form of data blocks. Here, too, depending on the volume of the modification message, it is provided that the corresponding data blocks are distributed over a sufficiently large number of user data blocks. As a rule, however, the modification message about the modification of the status messages will contain far fewer data than the status messages themselves, so that the modification message will only take up a few data blocks. User terminals can thus be informed very quickly and easily about modifications in the status messages, without the user terminal first having to wait for the complete transmission of updated status information. Another advantage is that the insertion of the modification message in place of status message data blocks does not result in any impact on the user data blocks.

It can furthermore be provided that the modification message is inserted into a user data block within a predefined update time frame. This is primarily significant when such update periods are determined by a specific application on the part of the user terminals or by the satellite data transmission system itself. Compliance with such update time frames can be effectively guaranteed by the process according to the invention.

As already stated, as a satellite data transmission system any type of such a system can be provided within the scope of the present invention, thus in particular also a satellite communications system whereby communication data are transmitted as user data.

In a special further development of the present invention, however, a satellite navigation system is provided as the satellite data transmission system whereby navigation data are transmitted as user data. Examples of such satellite navigation systems are the GPS system or the GLONASS system, which are already known from U.S. Pat. No. 6,205,377, or also the future European satellite navigation system GALILEO, which is known, e.g., from the already cited document J. Benedicto et al. *GALILEO: Satellite System Design and Technology Developments*. In such a case, in particular integrity messages concerning navigation satellites of a satellite navigation system can be provided as status messages and modification messages can be provided when a modification of integrity information occurs. As integrity messages, information can thereby be transmitted on the functional integrity and/or on the data integrity of navigation satellites. Either integrity information on the integrity of this navigation satellite or on the integrity of a selected group of navigation satellites or on the integrity of all the navigation satellites of the satellite navigation system (e.g., of the GALILEO system) to which the transmitting navigation satellite belongs can thereby be transmitted from a navigation satellite. Alternatively or additionally even integrity information on navigation satellites of other satellite navigation systems (e.g., of the GPS system or the GLONASS system) can be transmitted. Alternatively or additionally, however, other types of status information and modification messages can also be provided.

However, alternatively or additionally, e.g., confirmation messages for distress calls (Search and Rescue Return Information) and/or additional and auxiliary information as status information for distress call devices can also be transmitted in a satellite navigation system, thus, e.g., information on assistance measures for distress call situations on the position and equipment of rescue centers or rescue services en route, etc.

It can be furthermore provided that the modification message is inserted into the navigation data within a defined alarm time or a fraction of a defined alarm time of the satellite navigation system defined for the broadcast of status messages. Such an alarm time has already been fundamentally described in U.S. Pat. No. 6,205,377. Through the process according to the invention it can be effectively guaranteed that the transmission of the modification message and thus the retransmission of this information to the user terminals can also actually occur within the alarm time, since the modification measure is directly inserted into user data blocks in exchange for status message data blocks.

The present invention further comprises a user terminal for a satellite data transmission system featuring a receiver unit and a data processing unit for receiving and for processing user data blocks into which data blocks of status messages have been inserted according to a process described above. The user terminal is thus embodied to receive and to process the user data blocks produced and transmitted according to the described process, to recognize and process the data blocks of the status messages and to reconstruct in particular the status messages therefrom, and finally also to recognize and to process the modification messages. The user terminal can then update any status messages that might be stored in the user terminal on the basis of the recognized modification messages and, if necessary, take any steps that are necessary on the basis of the information in the modification message.

As already mentioned within the scope of the described process, the user terminal can be embodied as a terminal of at least one satellite navigation system. It can thus be embodied either to receive data from a single satellite navigation system or data from several navigation systems. However, the user terminal can also be embodied as a terminal of a satellite communications system.

In addition the user terminal can be embodied as a terminal of a further radio communication system whereby this additional radio communication system can be a terrestrial or satellite-based radio communication system. The user terminal can thus be embodied, e.g., as a mobile radio terminal that additionally features devices for satellite communication or satellite navigation or, e.g., as a satellite navigation terminal that also features devices for a data exchange via a mobile radio system. It is provided in particular for such a terminal that it features a first receiver unit and a first data processing unit for receiving and for processing user data blocks of a satellite data transmission system and a second receiver unit a second data processing unit for receiving and for processing user data blocks of a further radio communications system. This thus applies to the special case that both the satellite data transmission system and the radio communication system transmit data in the form of user data blocks.

A further subject of the present invention is a computer program for processing user data blocks of a satellite data transmission system, whereby data blocks of status messages have been inserted into the user data blocks according to a process described above. The computer program is embodied for interaction with devices—such as in particular a data processing unit, if necessary, also a receiver unit—of a user terminal, as described above. The computer program thus processes user data blocks received in interaction with a data processing unit, identifies in particular data blocks of status messages and joins status messages together again therefrom, recognizes modification messages and, if necessary, causes stored status message data to be updated on the basis of the recognized modification messages in the user terminal.

Finally, the present invention comprises a computer program product containing a machine-readable data carrier on which an above-described computer program is stored in the form of electronically readable driving signals. The driving signals can be stored in any suitable form, the electronic readout can then take place accordingly by electric, magnetic, electromagnetic, electro-optic or other electronic methods. Examples of such program carriers are magnetic tapes, diskettes, hard disks, CD-ROM or semi-conductor components.

The present invention is directed to a process for transmitting status messages to user terminals of a satellite data transmission system that transmits data formed as navigation blocks. The process includes reserving at least one selected data area in the navigation data blocks, splitting status messages into status data blocks that are smaller than the navigation data blocks, inserting the status data blocks into consecutive reserved data areas of the navigation data blocks and inserting, when the status messages are modified, modification message data blocks into subsequent reserved data areas of the navigation data blocks in place of one or more status data blocks of the status messages.

According to a feature of the invention, the satellite data transmission system may transmit the navigation data blocks from navigation satellites to the user terminals.

In accordance with another feature of the present invention, the reserving of the at least one data area can include reserving at least one data area in each navigation block in a regular sequence.

The at least one reserved data area may include a plurality of reserved data areas a navigation data block. The status data blocks in the reserved data areas can account for a maximum of 25% of a total data volume of the navigation data block. Further, the status data blocks in the reserved data areas can account for a maximum of 25% of an entire data content of the navigation data block.

According to the invention, the modification message can be inserted into the reserved data areas of the navigation data blocks within a pre-defined update time frame.

Moreover, the status messages may be composed of integrity messages concerning navigation satellites of a satellite navigation system, and the modification messages are provided when a modification of the integrity messages occurs. The integrity messages can be modified when integrity information changes. Still further, the integrity messages may be composed of information related to integrity of the transmitting navigation satellite or integrity of a selected group of navigation satellites of the satellite navigation system to which the transmitting navigation satellite belongs or integrity of all the navigation satellites of the satellite navigation system to which the transmitting navigation satellite belongs. The integrity messages can further be composed of information related to integrity of navigation satellites of other satellite navigation systems. Also, the integrity messages may be composed of information related to integrity of navigation satellites of other satellite navigation systems. The status messages may further be composed of at least one of distress calls and information for distress call devices. Further still, the inserting of the modification message into the navigation data blocks may occur within a defined alarm time of the satellite navigation system or a fraction of a defined alarm time of the satellite navigation system, in which the alarm time is defined for status message broadcasts.

According to another feature of the invention, the status messages can be composed of at least one of distress calls and information for distress call devices.

The instant invention is directed to a user terminal for a satellite data transmission system that includes a receiver unit and a data processing unit structured for receiving and processing navigation data blocks transmitted from a satellite data transmission system to process status messages transmitted in accordance with the above-discussed process.

According to a feature of the invention, the user terminal can be structured and arranged as a terminal of a radio communications system.

The invention is directed to a user terminal for a satellite data transmission system that includes a first receiver unit, a first data processing unit structured for receiving and processing navigation data blocks transmitted from a satellite data transmission system to process status messages transmitted in accordance with the above-discussed process, a second receiver unit, and a second data processing unit structured and arranged for receiving and processing user data blocks of a radio communications system.

The present invention is directed to a computer readable medium for processing navigation data blocks transmitted from a satellite data transmission system to process status messages transmitted in accordance with the process discussed above.

The invention is directed to a computer readable medium for processing navigation data blocks that is coupled to interact with the above-described user terminal.

In accordance with a feature of the invention, the computer readable medium may include a machine readable data carrier for storing data, in the form of electronically readable driving signals, for processing the navigation data blocks.

The instant invention is directed to a process for transmitting status messages to user terminals of a satellite data transmission system that transmits user data blocks from satellites to the user terminals. The process includes reserving a plurality of data areas in the user data blocks, splitting the status messages into status data blocks that are smaller than the use data blocks, inserting the status data blocks into consecutive reserved data areas of the user data blocks, and inserting, when there is a modification of the status messages, modification message data blocks into subsequent reserved data areas of the user data blocks in place of one or more status data blocks.

The present invention is directed to a process for transmitting data from satellite that includes forming navigation data blocks for transmission, reserving at least one selected data area in each navigation data block, splitting status messages into status data blocks that correspond to the size of the at least one reserved data area, and inserting the status data blocks into consecutive reserved data areas of the navigation data blocks.

In accordance with still yet another feature of the present invention, the process can further include inserting, when the status messages are modified, modification message data blocks into subsequent reserved data areas of the navigation data blocks in place of one or more status data blocks of the status messages.

The instant invention is directed to an apparatus for communicating status information between at least one satellite and a user terminals. The apparatus includes a receiver unit receiving transmitted data blocks, and a data processing unit structured for reading status data inserted into the transmitted data blocks and for storing the status data as status information.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An application of the invention will now be considered within the scope of a satellite navigation system, i.e., a satellite data transmission system that transmits mainly navigation data as user data with the aid of which user terminals can determine their current position. Such navigation data are transmitted to user terminals in consecutive data blocks NAV1, NAV2, . . . by navigation satellites that are in an orbit around the earth. Two such data blocks are shown by way of example in FIG. 1 which, e.g., for the GALILEO navigation system have a length of 1 second.

Selected data areas 1 are now reserved within these navigation data blocks, into which data areas status information can be inserted which then is transmitted to the user terminals together with the navigation data. Integrity information on navigation satellites are to be provided here as status information, i.e., information that informs the user terminal either about the transmitting navigation satellite itself or about a selected group of, e.g., six navigation satellites or about all navigation satellites of the respective satellite navigation system (e.g., the GALILEO system) whether and to what extent the terminal can use the navigation signals of these navigation satellites to determine its own position. However, alternatively or additionally integrity information can also be transmitted to navigation satellites of other satellite navigation systems (e.g., GPS or GLONASS). The production of this integrity information can take place according to a known process such as is described, e.g., in the already cited document J. Benedicto et al. *GALILEO: Satellite System Design and Technology Developments*, thus through certain monitoring devices that then transmit integrity messages to certain or all navigation satellites, which then in turn integrate these integrity messages into user data blocks according to the present invention.

Figure 1:
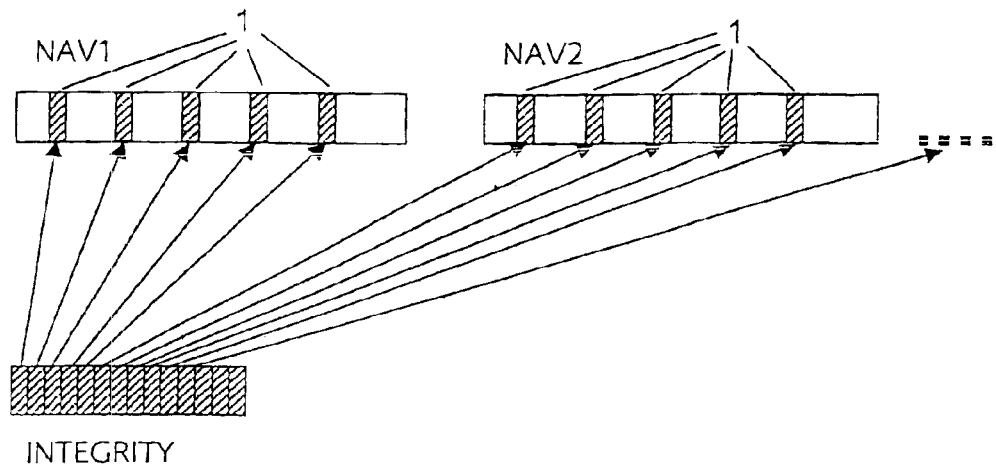
FIG. 1 diagrammatically illustrates integrity message data blocks in navigation data blocks.

As FIG. 1 shows, the integrity message INTEGRITY is split up into individual data blocks that are much smaller than the navigation data blocks NAV1, NAV2. The integrity data blocks are then inserted into the reserved data areas 1 of the navigation data blocks NAV1, NAV2, whereby the overall volume of the integrity data per navigation data block is ideally selected to be less than 25% in order nevertheless to be able to transmit as many navigation data as possible per navigation data block. In FIG. 1 the volume of an individual integrity data block is thus a maximum of 5% of the data volume of an entire navigation data block. The integrity message INTEGRITY shown in FIG. 1 is thus divided among the navigation data blocks NAV1, NAV2 and other subsequent navigation data blocks and transmitted to the user terminals in this form and, after the conclusion of a transmission, transmitted again, if necessary in updated form, if the integrity information about the individual navigation satellites has changed in the meantime.

Although in principle the integrity data blocks could be inserted as a single compact block into each navigation data block NAV1, NAV2, thus only a single larger reserved data area 1 is to be provided, it is advantageous to insert several smaller integrity data blocks into several smaller data areas 1 at time intervals per navigation data block NAV1, NAV2. The particular advantage of this measure is explained within the scope of the following description on the basis of FIG. 2.

Figure 2:
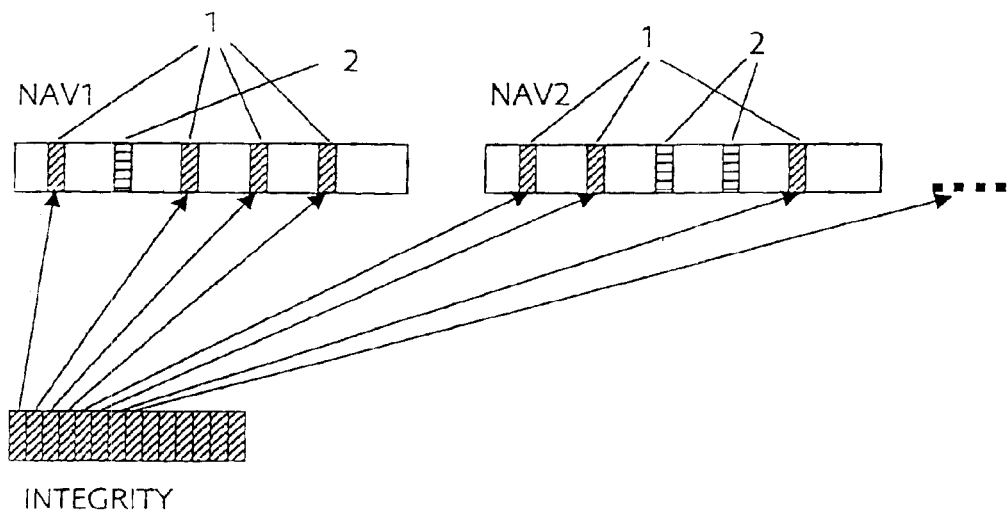
FIG. 2 diagrammatically illustrates insertion of modification message data blocks in place of the integrity message data blocks depicted in FIG. 1.

Thus integrity messages are transmitted to the user terminals in a regular sequence. Depending on the volume of the integrity messages, the transmission of these integrity messages can take a relatively long time that can exceed the alarm time of the satellite navigation system or the fraction of the alarm time that was defined for the broadcast of integrity messages, thus can exceed the time within which the user terminals have to be informed of clear modifications of the integrity conditions within the satellite navigation system. For example, an alarm time of 6 seconds can be defined in a satellite navigation system, but only a fraction thereof, e.g., 500 milliseconds or 1 second, can be defined as the alarm time fraction for a broadcast of integrity messages. In the case of FIG. 2, for example, the transmission of the integrity messages would take longer than the duration of two navigation data blocks, thus longer than 2 seconds in the case of the GALILEO system. Through the present invention, however, compliance with this alarm time specification is guaranteed in a simple and effective manner, as shown in FIG. 2.

If there is a modification to the integrity information, in place of integrity data blocks modification message data blocks 2 are inserted directly into the reserved areas 1 of the navigation data blocks NAV1, NAV2, whereby the number of the modification message data blocks 2 is determined by the volume of the modification message. After the insertion of the modification message data blocks 2, the insertion of the integrity data blocks is continued in the manner already described up to the end of the integrity message, and subsequently a new integrity message is inserted in which the modifications are taken into account that have already been transmitted in the modification message in advance to the user terminals. Thus modification message data blocks 2 are inserted into the integrity data blocks without thereby influencing the navigation data in the navigation data blocks NAV1, NAV2. Nevertheless, a transmission of the modified integrity information can take place to the user terminals directly.

This also shows the advantage of several small reserved data areas 1 per navigation data block NAV1, NAV2: if only one single larger data area 1 were reserved per navigation data block NAV1, NAV2, it is possible that a current modification message could not be inserted until the next navigation data block NAV1, NAV2, thus only after a duration of approx. 1 second. If, however, several small reserved data areas 1 are provided per navigation data block NAV1, NAV2, as shown in FIG. 2, the transmission of the modification message data block 2 can be started at several times within one navigation data block NAV1, NAV2. In the present case of FIG. 2 the maximum time until the next possible transmission time is only approx. ⅕ of the duration of a navigation data block NAV1, NAV2. The reaction time can thus be greatly reduced.

Figure 3:
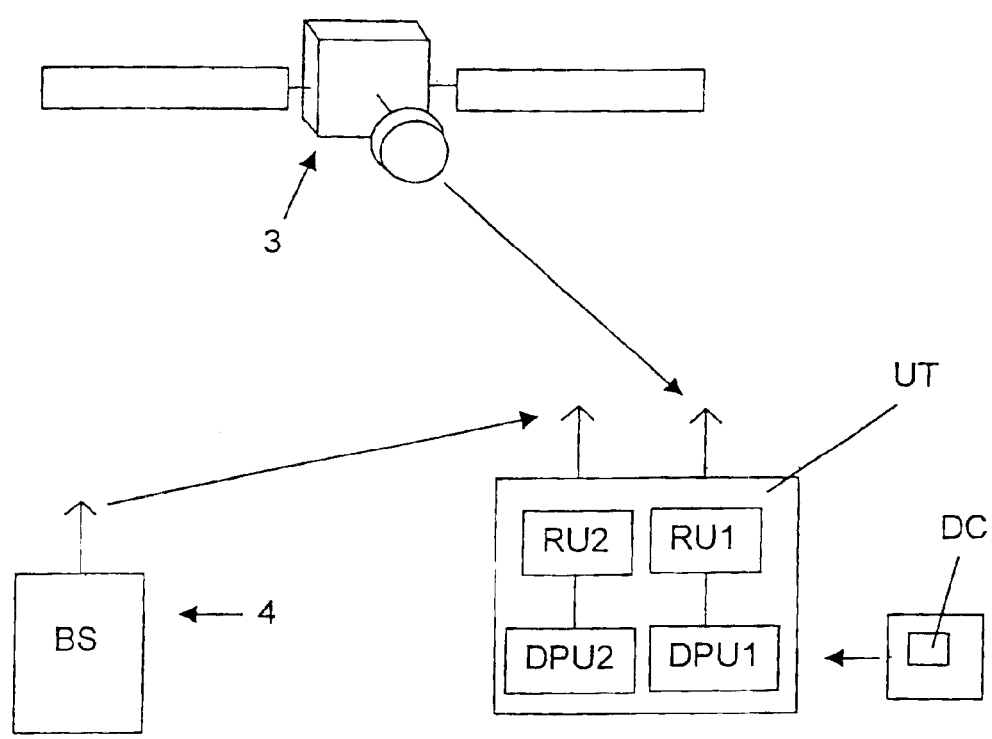
FIG. 3 diagrammatically illustrates data transmission to a user terminal.

FIG. 3 shows in diagrammatic form a user terminal UT for a satellite navigation system 3, a single navigation satellite of which is shown by way of example in FIG. 3. The user terminal features a receiver unit RU1 and a data processing unit DPU1 for receiving and for processing navigation data blocks NAV1, NAV 2. The data processing unit DPU1 is embodied to recognize and to process data blocks 1 of integrity messages INTEGRITY and to restore the original integrity messages INTEGRITY therefrom as shown in FIGS. 1 and 2. These can then be stored in a data storage (not shown) of the user terminal which can then be used for the further operation of the user terminal when necessary.

In addition, the user terminal UT is embodied as a terminal of a further radio communication system 4, in FIG. 3 as a terminal of a further mobile radio system. This mobile radio system is indicated in FIG. 3 by way of example in the form of a base station BS of the mobile radio system. To this end the user terminal features a second receiver unit RU2 and a second data processing unit DPU2 for receiving and for processing user data blocks of the mobile radio system. It can thus be embodied, e.g., as a mobile telephone that in addition contains a satellite navigation unit.

The user terminal UT can be equipped in particular with the aid of a computer program for processing the navigation data blocks NAV1, NAV2 of the satellite navigation system according to the process already described, if the other hardware requirements are met in the user terminal UT. The computer program then renders possible, in particular in interaction with the data processing unit DPU1, the recognition and processing of the data blocks 1 of integrity messages INTEGRITY that have been inserted into the navigation data blocks NAV1, NAV2 according to one of the methods described above. The original INTEGRITY integrity messages can be restored therefrom with the aid of the computer program. These can then be stored in a data storage (not shown) of the user terminal which can be used for the further operation of the user terminal when necessary. Moreover the computer program recognizes modification messages 2 and causes stored status message data INTEGRITY to be updated accordingly on the basis of the recognized modification messages 2 in the user terminal UT. The computer program can be inserted in the user terminal UT preferably with the aid of a computer program product, whereby the computer program product contains a machine-readable data carrier DC on which the computer program is stored in the form of electronically readable driving signals. An example of the case of a mobile telephone would be a chip card with a semi-conductor chip in which the computer program is stored. However, all other suitable types of computer program products can also be used.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for transmitting status messages to user terminals of a satellite data transmission system that transmits data formed as navigation blocks, comprising:
    reserving at least one selected data area in the navigation data blocks;
    splitting status messages into status data blocks that are smaller than the navigation data blocks;
    inserting the status data blocks into consecutive reserved data areas of the navigation data blocks; and
    in the event of a modification of status messages, inserting a modification message into the consecutive reserved data areas of the navigation data blocks of the status messages.

2. The process in accordance with claim 1, wherein the satellite data transmission system transmits the navigation data blocks from navigation satellites to the user terminals.

3. The process in accordance with claim 1, wherein the reserving of the at least one data area comprises reserving at least one data area in each navigation block in a regular sequence.

4. The process in accordance with claim 1, wherein the at least one reserved data area comprises a plurality of reserved data areas a navigation data block.

5. The process in accordance with claim 4, wherein the status data blocks in the reserved data areas account for a maximum of 25% of a total data volume of the navigation data block.

6. The process in accordance with claim 4, wherein the status data blocks in the reserved data areas account for a maximum of 25% of an entire data content of the navigation data block.

7. The process in accordance with claim 1, wherein the modification message is inserted into the reserved data areas of the navigation data blocks within a pre-defined update time frame.

8. The process in accordance with claim 1, wherein the status messages are composed of integrity messages concerning navigation satellites of a satellite navigation system, and the modification messages are provided when a modification of the integrity messages occurs.

9. The process in accordance with claim 8, wherein the integrity messages are modified when integrity information changes.

10. The process in accordance with claim 8, wherein the integrity messages are composed of information related to integrity of the transmitting navigation satellite or integrity of a selected group of navigation satellites of the satellite navigation system to which the transmitting navigation satellite belongs or integrity of all the navigation satellites of the satellite navigation system to which the transmitting navigation satellite belongs.

11. The process in accordance with claim 10, wherein the integrity messages are further composed of information related to integrity of navigation satellites of other satellite navigation systems.

12. The process in accordance with claim 8, wherein the integrity messages are composed of information related to integrity of navigation satellites of other satellite navigation systems.

13. The process in accordance with claim 8, wherein the status messages are further composed of at least one of distress calls and information for distress call devices.

14. The process in accordance with claim 8, wherein the inserting of the modification message into the navigation data blocks occurs within a defined alarm time of the satellite navigation system or a fraction of a defined alarm time of the satellite navigation system, in which the alarm time is defined for status message broadcasts.

15. The process in accordance with claim 1, wherein the status messages are composed of at least one of distress calls and information for distress call devices.

16. A user terminal for a satellite data transmission system comprising:
    a receiver unit; and
    a data processing unit structured for receiving and processing navigation data blocks transmitted from a satellite data transmission system to process status messages transmitted in accordance with the process of claim 1.

17. The user terminal in accordance with claim 16, wherein said user terminal is structured and arranged as a terminal of a radio communications system.

18. A user terminal for a satellite data transmission system comprising:

a first receiver unit;

a first data processing unit structured for receiving and processing navigation data blocks transmitted from a satellite data transmission system to process status messages transmitted in accordance with the process of claim 1;

a second receiver unit; and a second data processing unit structured and arranged for receiving and processing user data blocks of a radio communications system.

* * * * *